United States Patent
Johns

(10) Patent No.: US 11,283,834 B2
(45) Date of Patent: Mar. 22, 2022

(54) CLIENT-SIDE TAINT-PROTECTION USING TAINT-AWARE JAVASCRIPT

(71) Applicant: SAP SE, Walldorf (DE)

(72) Inventor: Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 54 days.

(21) Appl. No.: 16/218,732

(22) Filed: Dec. 13, 2018

(65) Prior Publication Data

US 2020/0195687 A1 Jun. 18, 2020

(51) Int. Cl.
*H04L 67/02* (2022.01)
*G06F 21/56* (2013.01)
*G06F 40/14* (2020.01)
*H04L 29/06* (2006.01)

(52) U.S. Cl.
CPC ........ *H04L 63/1483* (2013.01); *G06F 21/563* (2013.01); *G06F 40/14* (2020.01); *H04L 63/1416* (2013.01); *H04L 67/02* (2013.01)

(58) Field of Classification Search
CPC . H04L 63/1483; H04L 63/1416; H04L 67/02; G06F 21/563
USPC .......................................................... 726/23
See application file for complete search history.

(56) References Cited

U.S. PATENT DOCUMENTS

| | | | |
|---|---|---|---|
| 8,381,192 B1 * | 2/2013 | Drewry | G06F 11/3636 717/128 |
| 8,429,409 B1 | 4/2013 | Wall et al. | |
| 8,555,355 B2 | 10/2013 | Rathbun | |
| 8,694,784 B1 | 4/2014 | Lekies et al. | |
| 9,131,382 B1 | 9/2015 | Johns | |
| 9,535,750 B1 * | 1/2017 | Wilkes | G06F 9/4881 |
| 2007/0016949 A1 * | 1/2007 | Dunagan | G06F 21/53 726/22 |
| 2010/0125737 A1 | 5/2010 | Kang | |
| 2011/0126010 A1 | 5/2011 | Kim et al. | |
| 2011/0185406 A1 | 7/2011 | Hirson et al. | |
| 2011/0185427 A1 * | 7/2011 | Aciicmez | G06F 21/57 726/24 |
| 2011/0314337 A1 * | 12/2011 | Sinha | G06F 11/3624 714/37 |
| 2012/0144461 A1 | 6/2012 | Rathbun | |
| 2013/0086676 A1 * | 4/2013 | Chess | G06F 21/554 726/22 |
| 2013/0318056 A1 | 11/2013 | Lekies et al. | |
| 2014/0041023 A1 | 2/2014 | Lekies et al. | |
| 2014/0047538 A1 * | 2/2014 | Scott | G06F 11/3604 726/22 |
| 2014/0101447 A1 | 4/2014 | Lekies et al. | |
| 2014/0337760 A1 * | 11/2014 | Heinrich | G06F 40/14 715/753 |

(Continued)

OTHER PUBLICATIONS

Pan, Jinkun, Xiaoguang Mao, and Weishi Li. "Taint Inference for Cross-Site Scripting in Context of URL Rewriting and HTML Sanitization." ETRI journal 38.2 (2016): 376-386. (Year: 2016).*

(Continued)

*Primary Examiner* — Thanhnga B Truong
*Assistant Examiner* — Angela R Holmes
(74) *Attorney, Agent, or Firm* — Fish & Richardson P.C.

(57) ABSTRACT

Methods, systems, and computer-readable storage media for receiving, by a web browser executing on a client-side device, a response from a server, the response provided in a taint-enhanced data format, processing, by a Javascript framework executed by the web browser, the response to parse data within the response and, for any data values marked as tainted, providing respective taint string Javascript objects as sanitized data, and providing the sanitized data to a document object model (DOM).

20 Claims, 4 Drawing Sheets

(56) References Cited

U.S. PATENT DOCUMENTS

| | | | |
|---|---|---|---|
| 2015/0067853 A1* | 3/2015 | Amrutkar | H04L 63/14 726/23 |
| 2015/0121533 A1 | 4/2015 | Gluck et al. | |
| 2015/0304337 A1 | 10/2015 | Nguyen-Tuong et al. | |
| 2015/0309813 A1* | 10/2015 | Patel | G06F 11/3664 703/22 |
| 2015/0341385 A1* | 11/2015 | Sivan | H04L 63/1466 726/23 |
| 2017/0318045 A1 | 11/2017 | Johns et al. | |
| 2018/0025161 A1* | 1/2018 | Gauthier | H04L 63/1433 726/25 |
| 2020/0195686 A1 | 6/2020 | Johns | |

OTHER PUBLICATIONS

Zhu, David (Yu) et al. "TaintEraser: Protecting Sensitive Data Leaks Using Application-Level Taint Tracking." Operating systems review 45.1 (2011): 142-154. (Year: 2011).*

U.S. Appl. No. 13/928,872, filed Jun. 27, 2013, Martin Johns.
U.S. Appl. No. 13/959,951, filed Aug. 6, 2013, Johns et al.
U.S. Appl. No. 15/882,043, filed Jan. 29, 2018, Spiegel et al.
Final Office Action issued in U.S. Appl. No. 16/218,752 dated Mar. 30, 2021, 17 pages.
Halfond et al., "Using positive tainting and syntax-aware evaluation to counter SQL injection attacks." Proceedings of the 14th ACM SIGSOFT international symposium on Foundations of software engineering, Nov. 2006, 11 pages.
Davis et al., "DBTaint: Cross-Application Information Flow Tracking via Databases", WebApps 10, Jun. 2010, 12 pages.
Nethercote et al., "How to shadow every byte of memory used by a program." Proceedings of the 3rd international conference on Virtual execution environments, Jun. 2007, 10 pages.
Non-Final Office Action issued in U.S. Appl. No. 16/218,752 dated Oct. 15, 2020, 19 pages.
Non-Final Office Action issued in U.S. Appl. No. 16/218,752 dated Sep. 28, 2021, 25 pages.

* cited by examiner

CLIENT-SIDE TAINT-PROTECTION USING TAINT-AWARE JAVASCRIPT

BACKGROUND

Malicious users use attacks to disrupt operations, and/or access information. Example attacks can include injection attacks, such as cross-site scripting (XSS), and SQL injection. Data tainting, and dynamic taint tracking has been a potent measure for detecting, and mitigating injection attacks. Data tainting (also referred to as taint checking) includes associating data that is to be processed with taint information (e.g., character string) that indicates whether the respective data is potentially harmful (e.g., presents a potential security risk). In some instances, the taint information is propagated to any other data that is derived from the potentially tainted data.

Dynamic taint tracking enables detection of insecure dataflows in web applications that lead to injection vulnerabilities (e.g., SQL injection). It has also been shown that dynamic taint tracking can be used for taint protection (i.e., the transparent mitigation of injection attacks as they happen. Taint protection relies on the system's ability to detect tainted portions of string data that lead to situations, in which the tainted data determines the syntactic structure of a programming statement. To separate these actual attacks from benign application usage, in which only legitimate data values are tainted, the system has to parse the full programming statement and determine the syntactic context of the tainted characters. Consequently, parsing of the full code statement is required. As long as the overall size of the to-be-verified statement is small (as it is with SQL statements), or the actual occurrence of such events is rare (as it is with most OS command interfaces) the induced runtime is in most cases negligible, and at least tolerable.

Unfortunately, this does not hold for the mitigation of XSS, for which, in contrast to the other injection vulnerabilities, taint protection is costly. For example, for taint protection to work, the web application would have to completely parse every HTTP response (or at least all responses that contain at least one tainted character). As HTTP responses occur very frequently and are potentially very large, the performance penalty is significant.

SUMMARY

Implementations of the present disclosure are directed to taint protection. More particularly, implementations of the present disclosure are directed to client-side taint protection using taint-aware Javascript.

In some implementations, actions include receiving, by a web browser executing on a client-side device, a response from a server, the response provided in a taint-enhanced data format, processing, by a Javascript framework executed by the web browser, the response to parse data within the response and, for any data values marked as tainted, providing respective taint string Javascript objects as sanitized data, and providing the sanitized data to a document object model (DOM). Other implementations of this aspect include corresponding systems, apparatus, and computer programs, configured to perform the actions of the methods, encoded on computer storage devices.

These and other implementations can each optionally include one or more of the following features: actions further include sending, by the web browser, a request to the server, the server processing the request using dynamic taint-tracking to maintain a taint status of untrusted data within the request to provide the response; the dynamic taint-tracking is performed to selectively mark data values as tainted; each taint string Javascript object includes a first key indicating string values, and a second key indicating a taint status of each string value; the taint-enhanced data format is based on one of OData, JSON, and XML, and enables taint information to be carried along with respective string data values; the Javascript framework comprises a taint-aware Javascript model-view-controller (MVC) framework; and the sanitized data is provided as string data.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
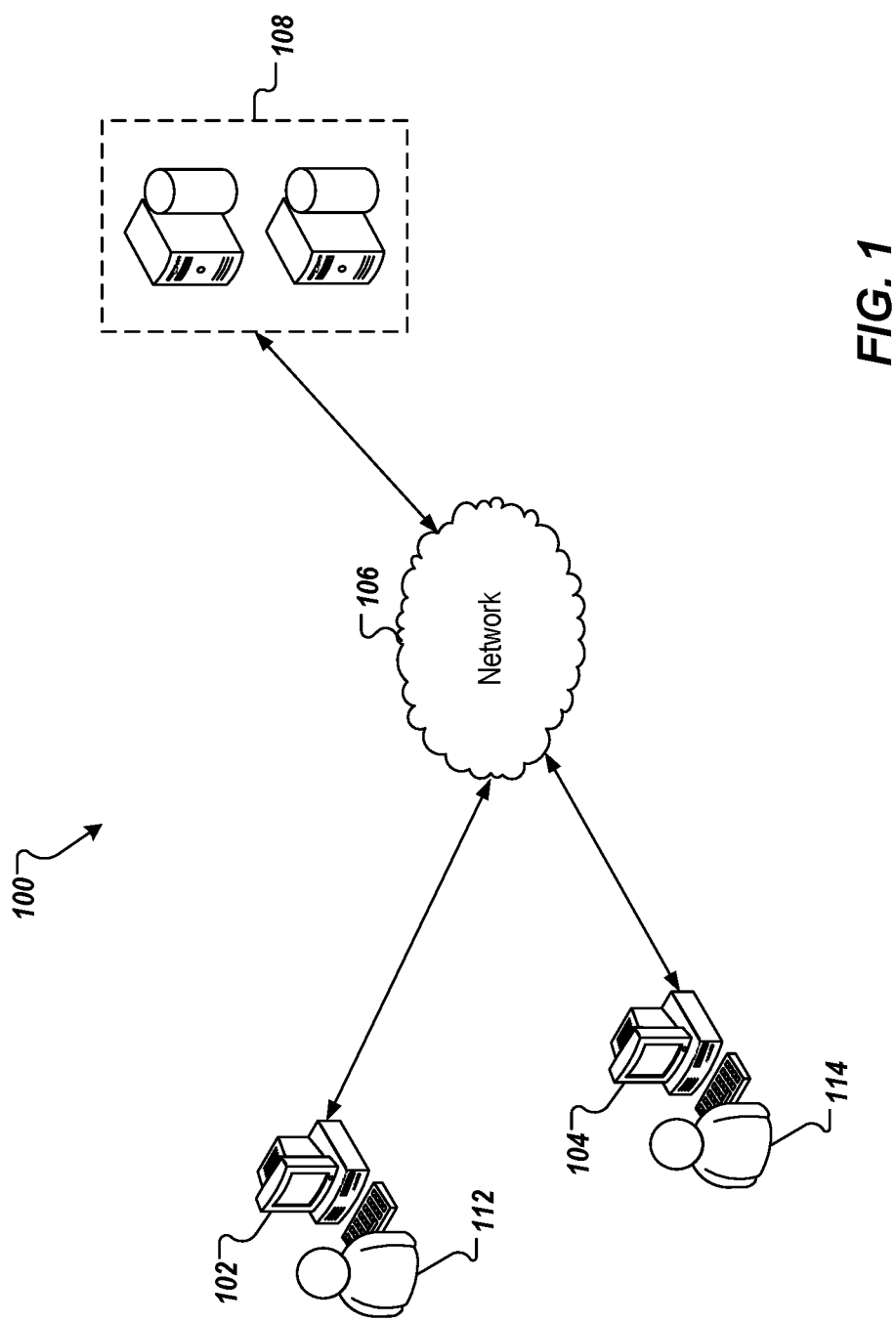
FIG. 1 depicts an example architecture that can be used to execute implementations of the present disclosure.

Implementations of the present disclosure are directed to taint protection. More particularly, implementations of the present disclosure are directed to client-side taint protection using taint-aware Javascript. Implementations can include actions of receiving, by a web browser executing on a client-side device, a response from a server, the response provided in a taint-enhanced data format, processing, by a Javascript framework executed by the web browser, the response to parse data within the response and, for any data values marked as tainted, providing respective taint string Javascript objects as sanitized data, and providing the sanitized data to a document object model (DOM).

To provide further context for implementations of the present disclosure, and as introduced above, dynamic taint tracking is a potent tool to detect insecure dataflows in web applications that lead to injection vulnerabilities (e.g., SQL injection). It has also been shown that dynamic taint tracking can be used for taint protection (i.e., the transparent mitigation of injection attacks as they happen. Taint protection relies on the system's ability to detect tainted portions of string data that lead to situations, in which the tainted data determines the syntactic structure of a programming statement. For example, in case of SQL injection, a tainted WHERE keyword or OR '1'='1 conditional.

To separate these actual attacks from benign application usage, in which only legitimate data values are tainted, the system has to parse the full programming statement and determine the syntactic context of the tainted characters. Consequently, parsing of the full code statement is required. As long as the overall size of the to-be-verified statement is small (as it is with SQL statements), or the actual occurrence of such events is rare (as it is with most OS command interfaces) the induced runtime is in most cases negligible, and at least tolerable.

Unfortunately, this assessment does not hold for the mitigation of cross-site scripting (XSS) attacks. In its essence, XSS is exactly the same vulnerability as SQL injection. However, in contrast to the other injection vulnerabilities, taint protection for XSS is costly. For example, for taint protection to work, the web application would have to completely parse every HTTP response (or at least all responses that contain at least one tainted character). As HTTP responses occur very frequently and are potentially very large, the performance penalty is significant.

In view of the above context, implementations of the present disclosure provide a system, in which taint protection is provided on the client-side (e.g., in a web browser) instead of the server-side. In some examples, the client-side protection approach is enabled through the dominant methodology of how modern applications are built. More particularly, modern web applications do not rely on the Web 1.0 approach, in which the application's HTML is dynamically assembled on the server-side and then pushed to the browser. Instead, modern web applications follow a model-view-controller (MVC) approach, in which static HTML and JavaScript are initially sent to the browser. The browser pulls dynamic data from server-side micro-services using data-only formats (e.g., JSON, OData). This programming paradigm is enabled through sophisticated JavaScript frameworks (e.g., AngularJS, SAP UI5).

In view of this, implementations of the present disclosure provide client-side taint protect (CTP) through client-side taint awareness (e.g., making MVC JavaScript frameworks taint-aware). Accordingly, the taint-aware framework is able to interpret taint information that is sent from the server along with the actual data, maintain the binding between the taint and the data thorough the client-side processing, and conduct taint-protection on runtime on the client-side. In this manner, the potential performance overhead is minimized. For one, the actual protection step is done on the client-side computer, in which relatively significant computation resources exist, and do not have to be shared with the other clients of the web application. Further, the actual amount of to-be-parsed data is magnitudes smaller, as compared to the server-side, because only single data items out of the JSON/OData structures have to be processed.

FIG. 1 depicts an example architecture 100 in accordance with implementations of the present disclosure. In the depicted example, the example architecture 100 includes one or more client devices 102, 104, a network 106, and a server system 108. The server system 108 includes one or more server devices and databases (e.g., processors, memory). In the depicted example, respective users 112, 114 interact with the client devices 102, 104. In an example context, the user 112 can interact with applications hosted on the server system 108 through the client device 102, and the user 114 can be a malicious user that conducts XSS attacks.

In some examples, the client devices 102, 104 can communicate with the server system 108 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client devices 102, 104 over the network 106).

In accordance with implementations of the present disclosure, and as noted above, CTP can be provided between a client-side device, and a server system. For example, the client device 102 can interact with a web application hosted on the server system 108. In some implementations, the client device 102 executes the CTP of the present disclosure to mitigate any XSS attacks attempted by the user 114.

As described in further detail herein, the CTP of the present disclosure includes a taint-enabled server runtime, a taint-enhanced data format, a taint-aware JavaScript MVC framework, and a taint-carrying string container object.

In some implementations, and with regard to the taint-enabled server-side runtime, the server-side code comprehensively marks all untrusted data as tainted and maintains the taint status of the data thorough character-level processing. Besides a set of static HTML templates and JavaScript resources, the server-side logic includes a set of micro-services (e.g., following the REST, or other web service patterns) that provide the HTTP-based interface to the application logic. HTTP requests to the micro-services push data to the application to be processed, and return data to be displayed using the templates and JavaScript framework functionality.

In some implementations, and with regard to taint-enhanced data format, all data communicated in HTTP responses from the server to the browser is encapsulated in a structured, taint-enhanced data format. Depending on the use-case, this format can be based on, without limitation, OData, JSON or XML, for example. Compared to existing formats the main distinguishing feature of the taint-enhanced data format of the present disclosure is its ability to carry taint-information alongside all string data values contained in a format instance. The taint-information is communicated on a character level, which enables the precise communication of string values that are only partially tainted.

In some implementations, the taint-aware JavaScript MVC framework receives HTTP responses from the server-side runtime, which are encoded in the taint-enhanced data format. In some examples, the receiving unit of the taint-aware JavaScript MVC framework parses the data messages and transforms them into hierarchical JavaScript objects with data values as tree leaves of the corresponding object tree structure. Implementations of the present disclosure use a custom, taint-carrying string container object. In some examples, the taint-carrying string container object (also referred to herein as TaintString) is a custom JavaScript object that extends JavaScript's native string functionality. This means that the TaintString offers the same syntactic properties (e.g., instantiated TaintSting objects carry the same properties/APIs and all APIs operation on strings also accept TaintString), as well as semantic functionality. The TaintString encapsulates both the string value as well as the corresponding taint information.

Figure 2:
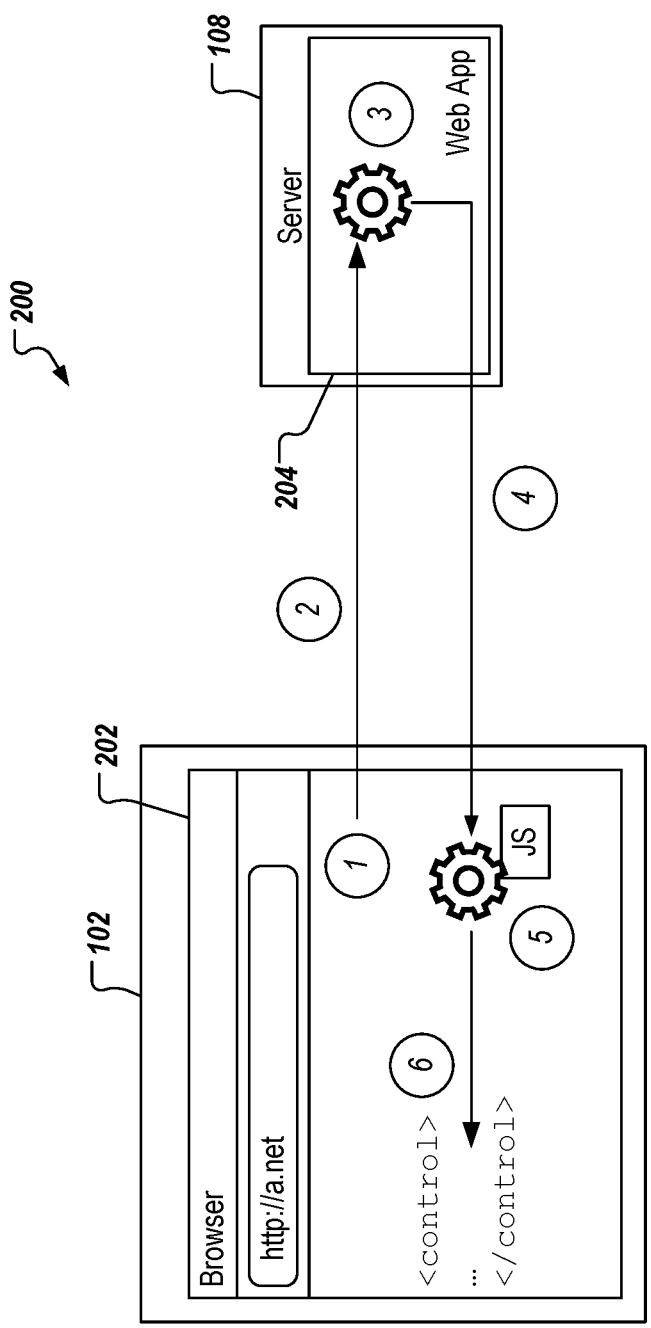
FIG. 2 depicts an example conceptual view of client-side taint protection in accordance with implementations of the present disclosure.

FIG. 2 depicts an example conceptual view 200 of client-side taint protection in accordance with implementations of the present disclosure. The example conceptual view includes the client device 102, and the server system 108 of FIG. 1. The client device 102 executes a browser application (browser) 202 that enables interaction with a web application 204 hosted on the server system 108. A high-level process of a typical taint-protected HTTP request/response flow is described in further detail herein with reference to FIG. 2.

In some implementations, the JavaScript framework creates and sends (1) an HTTP request to pull data from the server-side using a data HTTP endpoint. It can occur that the HTTP request includes taint information. The server-side code processes (2) the request, while maintaining the taint status of all untrusted data and compiles the data object for the response. The server processes the request compiles the HTTP response (3) using the taint-enhanced data format. The resulting data-representation is returned (4) to the client in the HTTP response. The taint-aware JavaScript framework parses the received data and creates (5) for all values that are marked as tainted specific data objects, which carry and maintain the taint information within the JavaScript runtime. When tainted data leaves (6) the confines of the JavaScript framework (e.g., to be inserted into the current document's DOM), the JavaScript framework (having exact information about the syntactic context, into which the data is to be inserted) parses the data and applies the matching taint protection measures.

In accordance with implementations of the present disclosure, the TaintString object can be considered the core of CTP. As introduced above, the TaintString object is a direct sub-class of JavaScript's string object. This way, all API/property interfaces, and all native string functionality is maintained. In some examples, the TaintString object is realized as a user-land JavaScript object. Consequently, the TaintString object can be used in any browser without the modification. Listing 1 provides an illustrative example:

```
// Define class TaintString
function TaintString(s,t) {
    this.value = s || '';
    this.taint = t || [s.length];
    Object.defineProperty(this, 'length', {get:
        function ( ) { return this.value.length; }});
    this.getTaintStatus = function(index){
        return this.taint[index];
    }
    this.sanitizedValue= function( ){
        var orgVal = this.value;
        var sanVal = ... // Sanitize all tainted portions
        return sanVal;
    }
};
TaintString.prototype = Object.create(String.prototype);
TaintString.prototype.toString = TaintString.prototype.valueOf
    = function( ){return this.sanitizedValue( )};
```

Listing 1: Example Method for TaintString Object

In some implementations, when instantiating a TaintString object, an optional taint-array can be passed to the constructor to mark individual characters of the string as untrusted (i.e., tainted). All methods and properties of the TaintString object are adapted to transparently maintain the binding between the characters and their taint status. Further, all global JavaScript APIs that process string values are also adapted using instrumentation to maintain the taint status.

The TaintString object is secure by default. That is, whenever a non-taint-aware functionality accesses the objects value (e.g., through implicit usage of the object's toString and valueOf), the object first sanitizes all tainted portions using context-sensitive encoding, before the value is passed to the API caller. In this manner, no accidental XSS problem can be introduced from tainted values. Listing 2 provides an illustrative example for transparent encoding.

```
// Untainted String
var good = new TaintString('<b>John Doe</b>');
console.log(good.getTaintStatus(2)); // --> undefined
// No sanitation, as the value is trusted
document.write(good); // --> <b>John Doe</b>
// Tainted String
var bad = new TaintString('<script>alert(1)</script>',
    [1,1,1 ... ,1,1]);
console.log(bad.getTaintStatus(2)); // --> 1
// Transparent sanitation of the tainted characters
document.write(bad); // --> <script>alert(1)</script>
```

Listing 2: Example of TaintString Object Use

For taint-aware functionality, both the raw value as well as the taint information is available through the object's interface. This enables precise, context-sensitive evaluation, as to whether the tainted data potentially influences syntactic structures. In this manner, robust taint protection can be realized. Further, this approach conserves computing resources. For example, only values that are actually used in a security sensitive context are subject to parsing and other resource-costly operations.

With regard to communicating server-side taint, the CTP of the present disclosure relies on a taint-enabled server-side runtime. Based on the server-side trust policies, data is selectively marked as untrusted during the processing. Whenever such tainted data objects are serialized into a HTTP response body (i.e., transformed from their internal binary representation into a character-based representation), all tainted strings are accompanied with the corresponding taint-communicating structures. An example is described in further detail below, in which the OData format is extended in this fashion.

With regard to client-side taint protection, within the web browser, the JavaScript framework parses the HTTP responses, and creates the framework-specific data objects. During the parsing process, for all members of this object that carry string data, TaintString objects are created and are passed into the object's matching data slots.

All view-components in the framework, that directly pass string-data into the application's web document (i.e., the DOM) implement taint protection. This means, that all strings obtained from the internal data objects are first tested for tainted character ranges. If such a range is found, the full string, together with its surrounding syntactic content, is parsed with the matching parser (i.e., the HTML, URL, CSS, or JavaScript parser). If this parsing process determines that the structure of the resulting parse tree depends on tainted data, an active injection attack is noticed. In this case, a matching alert is sent back to the server-side, notifying the application operator of the attempted attack. Further, the injected syntactic content is disarmed either using context-sensitive encoding, or through completely discarding the untrusted data.

By way of non-limiting example, realization of CTP is described with reference to an adaption of the OData format, and the SAP UI5 JavaScript framework provided by SAP SE of Waldorf, Germany. SAP UI5 consumes server-side data through the OData format. To realize CTP, TaintOData, which is a taint-enhanced version of OData, is implemented. In all fields that carry string values, TaintOData enables a data union that carries both the character-based string value and the corresponding taint information. The information is structured in the form of a dictionary, in which the key v carries the character-string-value, and the key t the taint information. This is depicted in the example of Listing 3, which provides an example TaintOData message encoded in the OData protocol version 4.0 JSON format, which highlights the abilities of the taint format of the present disclosure.

SAP UI5 is a JavaScript application framework maintained by SAP SE. The library's feature set includes model-view-controller (MVC) patterns, data binding, its own UI-element library, and internationalization support. In some settings, the communication with the back-end server-side is done using OData/REST. Further, SAP UI5 is built on standard controls, which offer auto-encoding for untrusted data by default, and enables programmers to design their own custom controls using the HTML container element. Depending on the element's settings (e.g., a sanitizeContent flag), syntactic data passed to such an element may not be sanitized and, thus, used verbatim within the embedding DOM. Consequently, any untrusted data within such an element is prone to cause injection attacks.

To realize taint protection for SAP UI5, the library is adapted. For example, the parsing process that creates OData models from the received OData (i.e., the OData binding) is adapted to correctly parse TaintOData, and create OData container instances, which carry TaintString objects instead of native strings for tainted elements. as another example, the internal representation of the HTML Container is made taint-aware. That is, all functionality that interacts with the embedding DOM first has to check the taint-status of the data to be inserted into the document. If tainted characters are found, the full content of the HTML container is parsed using the content's matching parser(s). If the tainted data influences the syntactic structure of the content (e.g., the structure of the content's parse tree depends on the tainted data), an attempted attack is identified and the appropriate reactions (e.g, removal of the tainted data, alerting the server-side) are triggered. The rest of the UI library requires no adaption, as the transparent taint implementation of the TaintString object in combination with the above-adaptations provide end-to-end propagation of taint data and, thus, complete taint protection.

```
{
    "@todata.context": "serviceRoot/$metadata#People",
    "@todata.nextLink": "serviceRoot/People?%24skiptoken=8",
    "value": [
        {
            "@todata.id": "serviceRoot/People('keithpinckney')",
            "@todata.etag": "W/"08D1694BD49A0F11"",
            "@todata.editLink":
                "serviceRoot/People('keithpinckney')",
            "UserName":
                {"v": "keithpinckney",
                 "t": "1111111111111"},
            "FirstName": "Keith",
            "LastName": "Pinckney",
            "Emails": [
                {"v": "Keith@example.com",
                 "t": "11111000000000000"},
                "Keith@contoso.com"
            ],
            "AddressInfo": [ ],
            "Gender": "Male",
            "Concurrency": 6354047968462804000
        }
    ]
}
```

Listing 3: Example TaintOData Message

In the example of Listing 3, the username was supplied by a tainted source (lines 11 and 12), and the email value is partially tainted with the domain part being trustworthy (lines 16 and 17).

Figure 3:
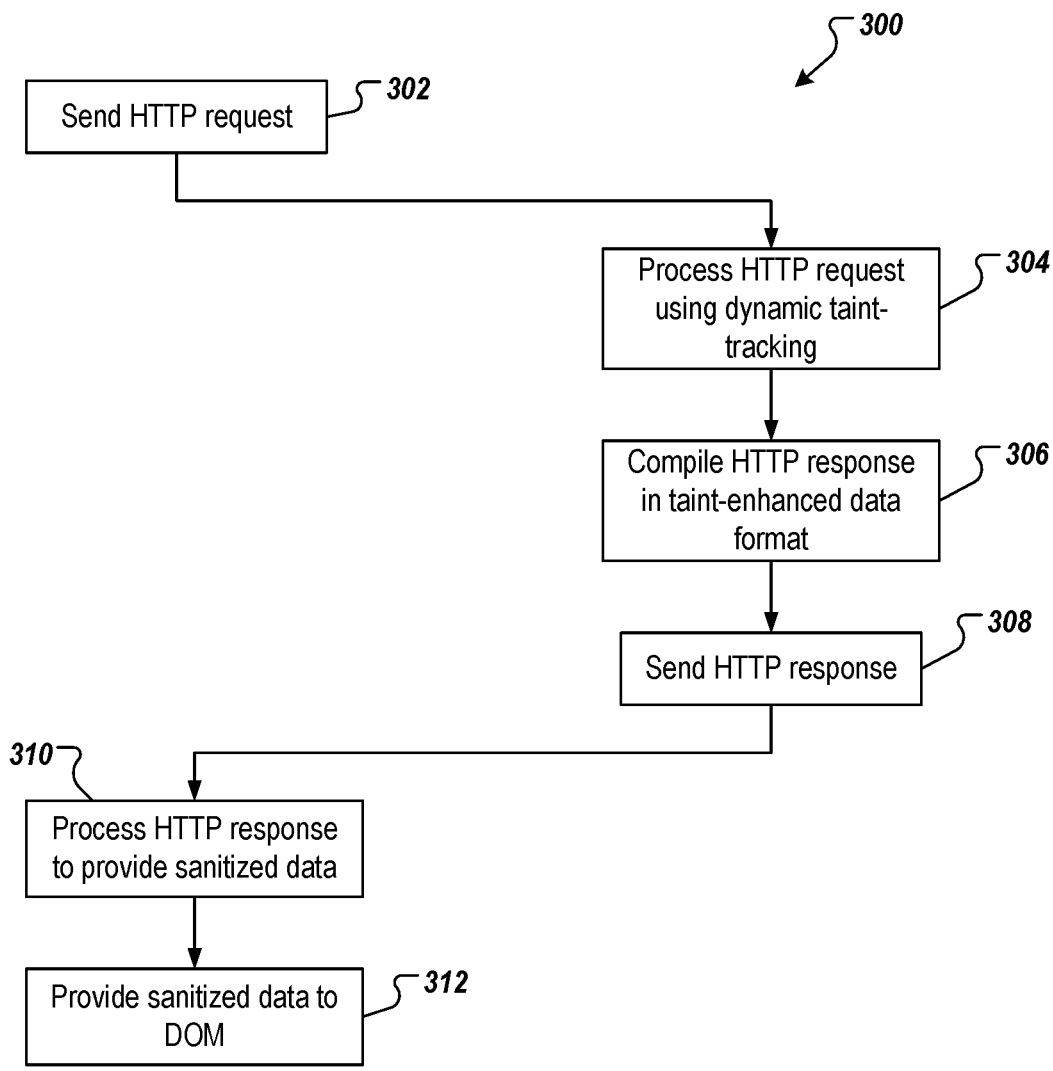
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

An HTTP request is sent (302). For example, and as described above with reference to FIG. 2, the JavaScript framework creates and sends (1) an HTTP request to pull data from the server-side using a data HTTP endpoint. It can occur that the HTTP request includes taint information. The HTTP request is processed using dynamic taint-tracking (304). For example, the server-side code processes the HTTP request, while maintaining the taint status of all untrusted data. An HTTP response in a taint-enhanced data format is compiled (306), and the HTTP response is sent (308). For example, the server processes the request compiles the HTTP response using the taint-enhanced data format, and the resulting data-representation is returned to the client in the HTTP response. The HTTP response is processed to provide sanitized data (310), and the sanitized data is provided to a DOM (312). For example, the taint-aware JavaScript framework parses the received data and creates, for all values that are marked as tainted, respective data objects, which carry and maintain the taint information within the JavaScript runtime. When tainted data leaves the confines of the JavaScript framework (e.g., to be inserted into the current document's DOM), the JavaScript framework (having exact information about the syntactic context, into which the data is to be inserted) parses the data and applies the matching taint protection measures.

Figure 4:
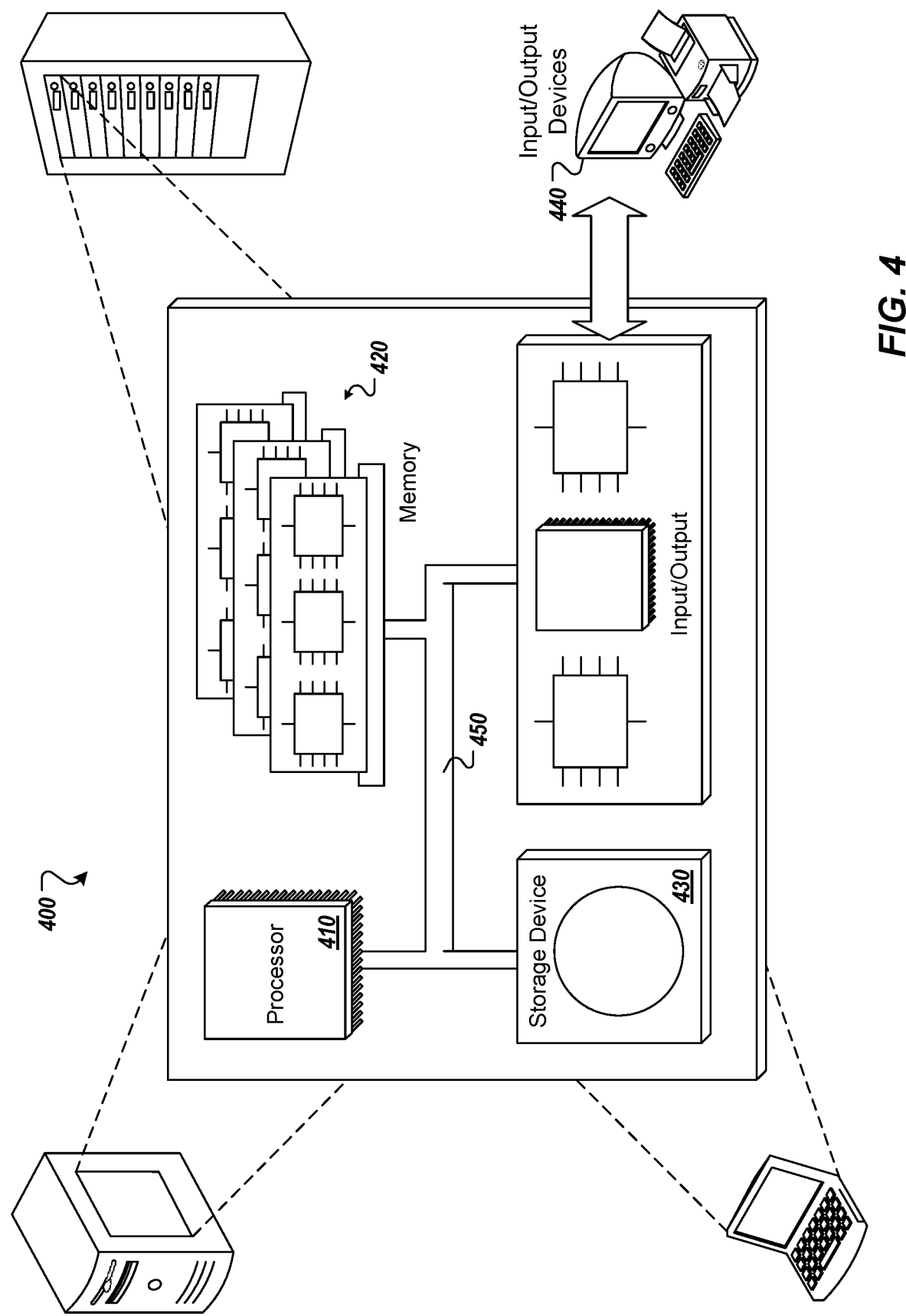
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for client-side taint protection, the method being executed by one or more processors and comprising:

sending, by a web browser executing on a client-side device, a request for data from a server, the request comprising taint information;

receiving, by the web browser executing on the client-side device, a response based on the request from the server, the response provided in a taint-enhanced data format, wherein the response in the taint-enhanced data format comprises the data and tainted status corresponding to the data on a character level;

processing, by a Javascript framework executed by the web browser, the response to parse the data within the response and, for any data values marked as tainted, transforming the data values into respective taint string Javascript objects as sanitized data, each taint string Javascript object being a direct sub-class of a string object of Javascript and comprising a hierarchical tree structure with data values as leaves, and string functionality extended from Javascript to encapsulate the data values and corresponding taint information;

providing the sanitized data to a document object model (DOM); and notifying, based on the DOM, an active injection attack in response to determining that a resulting parse tree of the sanitized data depends on tainted data.

2. The method of claim 1, further comprising sending, by the web browser, a request to the server, the server processing the request using dynamic taint-tracking to maintain the taint status of untrusted data within the request to provide the response.

3. The method of claim 1, wherein each taint string Javascript object comprises a first key indicating string values, and a second key indicating a taint status of each string value.

4. The method of claim 1, wherein the taint-enhanced data format is based on one of Open Data Protocol (OData), JavaScript Object Notation (JSON), and eXtensible Markup Language (XML), and enables taint information to be carried along with respective string data values.

5. The method of claim 1, wherein the Javascript framework comprises a taint- aware Javascript model-view-controller (MVC) framework.

6. The method of claim 1, wherein the sanitized data is provided as string data.

7. The method of claim 2, wherein the dynamic taint-tracking is performed to selectively mark data values as tainted.

8. A non-transitory computer-readable storage medium coupled to one or more processors and having instructions stored thereon which, when executed by the one or more processors, cause the one or more processors to perform operations for client-side taint protection, the operations comprising:

sending, by a web browser executing on a client-side device, a request for data from a server, the request comprising taint information;

receiving, by the web browser executing on the client-side device, a response based on the request from the server, the response provided in a taint-enhanced data format, wherein the response in the taint-enhanced data format comprises the data and tainted status corresponding to the data on a character level;

processing, by a Javascript framework executed by the web browser, the response to parse the data within the response and, for any data values marked as tainted, transforming the data values into respective taint string Javascript objects as sanitized data, each taint string Javascript object being a direct sub-class of a string object of Javascript and comprising a hierarchical tree structure with data values as leaves, and string functionality extended from Javascript to encapsulate the data values and corresponding taint information;

providing the sanitized data to a document object model (DOM); and notifying, based on the DOM, an active injection attack in response to determining that a resulting parse tree of the sanitized data depends on tainted data.

9. The computer-readable storage medium of claim 8, wherein operations further comprise sending, by the web browser, a request to the server, the server processing the request using dynamic taint-tracking to maintain the taint status of untrusted data within the request to provide the response.

10. The computer-readable storage medium of claim 8, wherein each taint string Javascript object comprises a first key indicating string values, and a second key indicating a taint status of each string value.

11. The computer-readable storage medium of claim 8, wherein the taint-enhanced data format is based on one of Open Data Protocol (OData), JavaScript Object Notation (JSON), and eXtensible Markup Language (XML), and enables taint information to be carried along with respective string data values.

12. The computer-readable storage medium of claim 8, wherein the Javascript framework comprises a taint-aware Javascript model-view-controller (MVC) framework.

13. The computer-readable storage medium of claim 8, wherein the sanitized data is provided as string data.

14. The computer-readable storage medium of claim 9, wherein the dynamic taint-tracking is performed to selectively mark data values as tainted.

15. A system, comprising:

a computing device; and a computer-readable storage device coupled to the computing device and having instructions stored thereon which, when executed by the computing device, cause the computing device to perform operations for client-side taint protection, the operations comprising:

sending, by a web browser executing on a client-side device, a request for data from a server, the request comprising taint information;

receiving, by the web browser executing on the client-side device, a response based on the request from the server, the response provided in a taint-enhanced data format, wherein the response in the taint-enhanced data format comprises the data and tainted status corresponding to the data on a character level;

processing, by a Javascript framework executed by the web browser, the response to parse the data within the response and, for any data values marked as tainted, transforming the data values into respective taint string Javascript objects as sanitized data, each taint string Javascript object being a direct sub-class of a string object of Javascript and comprising a hierarchical tree structure with data values as leaves, and string functionality extended from Javascript to encapsulate the data values and corresponding taint information;

providing the sanitized data to a document object model (DOM); and notifying, based on the DOM, an active injection attack in response to determining that a resulting parse tree of the sanitized data depends on tainted data.

16. The system of claim 15, wherein operations further comprise sending, by the web browser, a request to the server, the server processing the request using dynamic taint-tracking to maintain the taint status of untrusted data within the request to provide the response.

17. The system of claim 15, wherein each taint string Javascript object comprises a first key indicating string values, and a second key indicating a taint status of each string value.

18. The system of claim 15, wherein the taint-enhanced data format is based on one of Open Data Protocol (OData), JavaScript Object Notation (JSON), and eXtensible Markup Language (XML), and enables taint information to be carried along with respective string data values.

19. The system of claim 15, wherein the Javascript framework comprises a taint-aware Javascript model-view-controller (MVC) framework.

20. The system of claim 16, wherein the dynamic taint-tracking is performed to selectively mark data values as tainted.

\* \* \* \* \*